Figure 1:
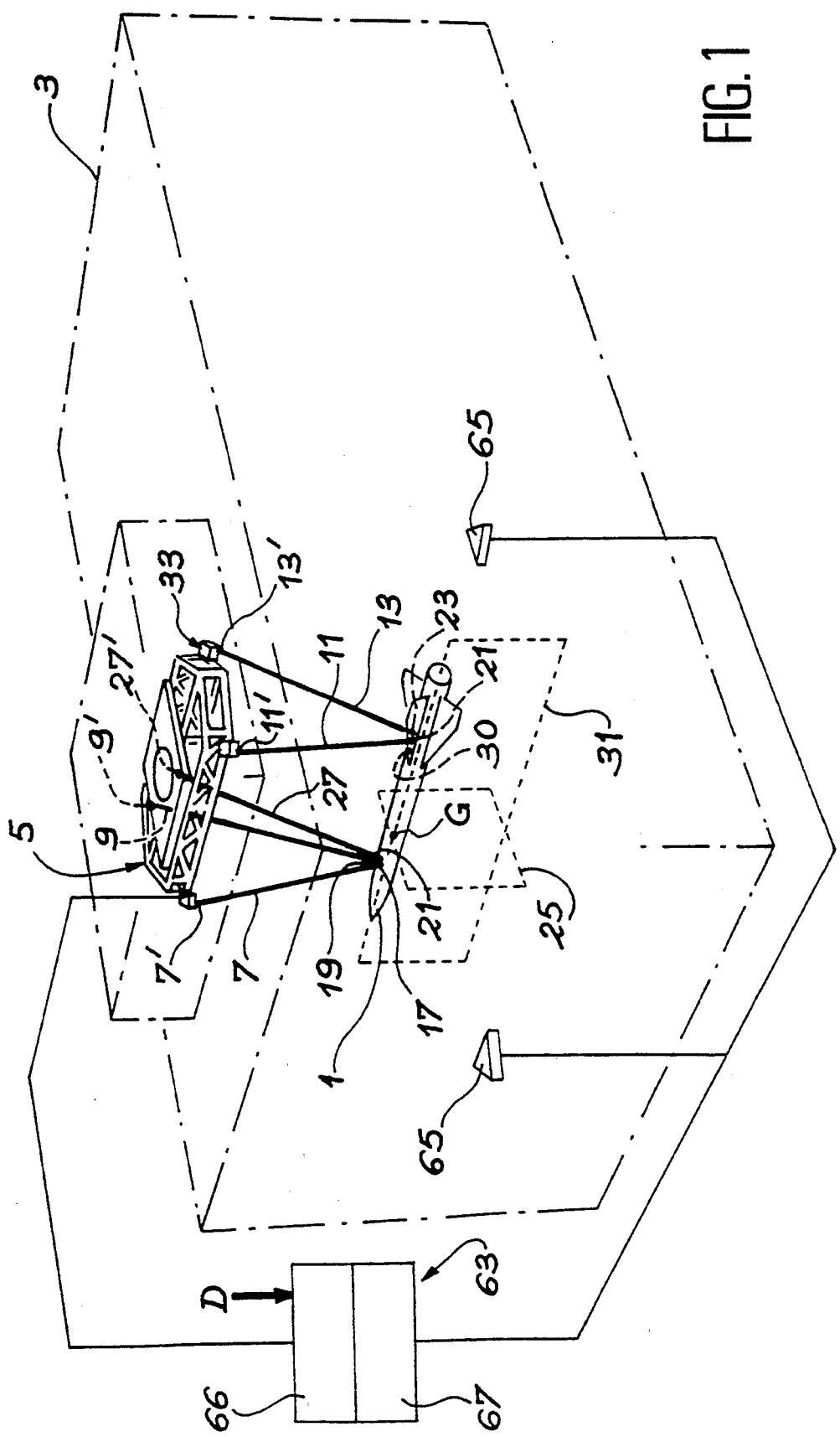

United States Patent [19]
Bousquet et al.

[11] Patent Number: 5,370,349
[45] Date of Patent: Dec. 6, 1994

[54] STRUCTURE FOR POSITIONING AND STABILIZING AN OBJECT AT A GIVEN POINT WITHIN A THREE-DIMENSIONAL COORDINATE SYSTEM

[75] Inventors: Jean-Claude Bousquet, Bourges-F; Bernard Maupetit, Savigny en Septaine; Michel Auroux, Fussy; Gérard Goninet, Bourges, all of France

[73] Assignee: Aerospatiale Societe Nationale Industrielle, Paris, France

[21] Appl. No.: 26,829

[22] Filed: Mar. 5, 1993

[30] Foreign Application Priority Data

Mar. 6, 1992 [FR] France .................. 92 02724

[51] Int. Cl.⁵ ............................................. F16H 11/00
[52] U.S. Cl. ................................. 243/332; 248/659
[58] Field of Search ............... 248/332, 329, 320, 610, 248/659, 669; 244/137.4

[56] References Cited

U.S. PATENT DOCUMENTS

| | | | |
|---|---|---|---|
| 2,135,394 | 11/1938 | Geissen | 248/610 X |
| 2,869,901 | 1/1959 | Czerwinski | 285/181 |
| 2,910,866 | 11/1959 | Czerwinski | 73/147 |
| 2,953,969 | 9/1960 | Pepple | 248/320 X |
| 3,032,308 | 5/1962 | Hansen | 248/329 |
| 3,160,060 | 12/1964 | Zsoka et al. | |
| 3,421,363 | 1/1969 | Herr | 244/110 R |
| 3,469,814 | 9/1969 | Carlson et al. | 248/320 X |
| 3,516,628 | 6/1970 | Kendall | 248/324 X |
| 3,731,898 | 5/1973 | Smith | 248/610 X |
| 4,115,845 | 9/1978 | Blahut | 248/320 X |
| 4,135,688 | 1/1979 | England | 248/610 X |
| 4,198,022 | 4/1980 | Pletcher et al. | 248/320 |
| 4,604,938 | 8/1986 | Kennedy et al. | 244/110 A X |

FOREIGN PATENT DOCUMENTS 2398294 2/1979 France .

*Primary Examiner*—Karen J. Chotkowski
*Attorney, Agent, or Firm*—Finnegan, Henderson, Farabow, Garrett & Dunner

[57] ABSTRACT

The invention relates to a structure for positioning an object in a three-dimensional coordinate system.

The object of the invention is to obtain a structure making it possible to orient an object in space without displacing its center of gravity.

This object is achieved with the aid of a structure incorporating a support (5), at least five slings (7, 9, 11, 13, 27) for suspending the object (1) on said support (5) and means (33) for regulating the length of each sling.

This structure more particularly makes it possible to position a tactical missile with an anechoic or dead room.

10 Claims, 4 Drawing Sheets

STRUCTURE FOR POSITIONING AND STABILIZING AN OBJECT AT A GIVEN POINT WITHIN A THREE-DIMENSIONAL COORDINATE SYSTEM

DESCRIPTION

The invention relates to a structure for positioning and stabilizing an object at a given point within a three-dimensional coordinate system. This structure in particular permits the stabilized positioning at a given point or in accordance with an imposed displacement law of an object such as a missile or in more general terms a tactical missile, in a sealed enclosure, such as an anechoic room.

Modern tactical missiles pass through enemy areas over distances of tens to hundreds of kilometers before detecting and then reaching their targets. The latter are protected by radars, so that it is necessary for the missiles to remain undetected until they reach them. Therefore the missiles must be stealthy. In order to control and reduce the radar signature of these tactical missiles, it is important to carry out a certain number of very precise measurements within an anechoic room. During these measurements, performed on natural size missiles, it is necessary to take a specimen missile on the ground, raise it and position it in space as accurately as possible and in all security, whilst ensuring its immobility throughout the measurement and its displacement in space between successive measurements.

The prior art discloses an apparatus constituted by a tower or mast set up within an anechoic chamber and making it possible to keep a specimen missile at a certain distance from the ground (cf. particularly the journal "Air et Cosmos", no. 1352, pp. 34/35). However, this mast has a disturbing radar signature for all measurements performed on this missile. This supplementary radar signature may lead to errors of calculation. It is also necessary to use a lifting means for installing the specimen missile at the top of the mast. Finally, position changes of the specimen missile are difficult to carry out.

The prior art also discloses an apparatus having four metal bars fixed to the ceiling on the anechoic room and which make it possible to maintain in space objects such as a fighter aircraft (cf. "Air et Cosmos", no. 1351, p. 11). In said apparatus, the four metal bars are fixed at four different points of the aircraft and make it possible to keep the latter in a certain attitude. However, when the incidence of the aircraft with respect to the ground is modified, its centre of gravity is displaced with respect to the three-dimensional coordinate system. Therefore this apparatus is not usable for measurements which it is wished to carry out on tactical missiles, where it is necessary for the missile centre of gravity to remain in the centre of the anechoic room throughout the measurements and despite missile incidence changes.

Finally, an apparatus with eight cables is known making it possible to position a missile or elongated object within an anechoic room. In this case, the object is held by four cables fixed in the upper part thereof, as well as to the ceiling of the room and by four other cables fixed in the lower part and connected to the floor of the room. However, when it is wished to rotate the missile, it is necessary to have two upper and lower supports, which are strictly parallel and making it possible to simultaneously rotate all the cables, so as to ensure that the latter do not pass round one another.

The object of the invention is to obviate the aforementioned disadvantages.

To this end, the invention relates to a structure for the positioning and stabilizing of an object at a given point within a three-dimensional coordinate system, said structure having a support, two pairs of slings for suspending the object on said support and means for regulating the length of each sling, said two pairs of slings being respectively attached at four different suspension points of the support and in two pairs of fixing points, provided on the surface of the object and respectively on either side of the transverse vertical plane passing through the centre of gravity of the object.

According to the features of the invention, said structure comprises at least one fifth sling attached to the support at a fifth suspension point different from the four first points and on the object at a fifth fixing point, said fifth fixing point being located in the longitudinal vertical plane passing through the centre of gravity of the object to be positioned and on one or other side of the transverse vertical plane passing through the centre of gravity of the object, the two pairs of fixing points also being placed in the longitudinal vertical plane passing through the centre of gravity of the object.

These slings make it possible in a single operation to raise the object from the ground or vehicle on which it is introduced into the anechoic room and bring it into the desired spatial position. The fifth sling makes it possible to stabilize the movements of the object and prevent the latter from being exposed to prolonged oscillations. Finally, during spatial displacements of the object, said fifth sling makes it possible to reposition the centre of gravity of the object in question or more specifically maintain it in a fixed position in space, despite the displacements of said object.

Preferably, the support can turn in a horizontal plane about a vertical axis passing through the fifth suspension point, which makes it possible to pivot the tested object by 360°.

Advantageously, the means for regulating the length of each sleeve incorporate a drum about which said sling is wound and a geared motor rotating the said drum.

As a result of this conventional mechanical apparatus, the length of the slings can be adjusted to obtain a positioning accuracy of the object below 1 mm at all points thereof.

Finally and advantageously, the means for regulating the length of each sling are connected to servocontrol means of equipment for measuring the position of the object relative to the three-dimensional coordinate system, said servocontrol means incorporating a computer and making it possible to act on said regulating means. This makes it possible to considerably simplify the handling operations performed on the object in question.

The invention is described in greater detail hereinafter relative to non-limitative embodiments and with reference to the attached drawings, wherein show:

FIG. 1 An overall diagram of the positioning structure according to the invention placed within a three-dimensional coordinate system.

Figure 2:
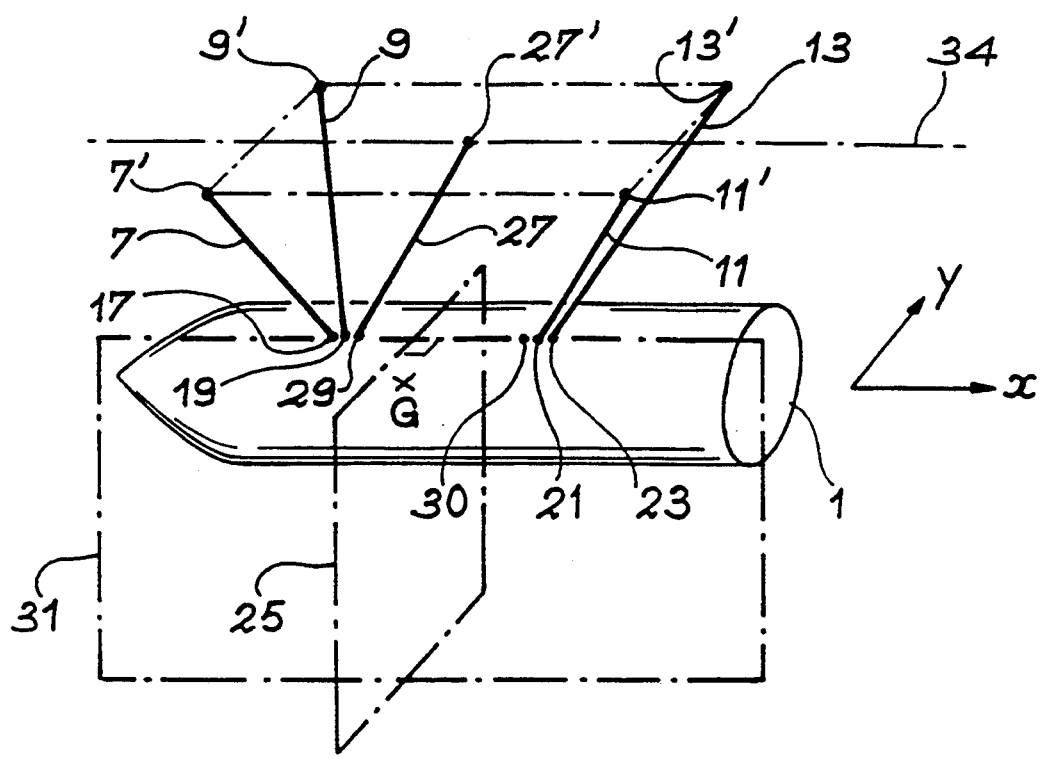

FIG. 2 A diagram illustrating an object positioned according to the invention.

Figure 3:
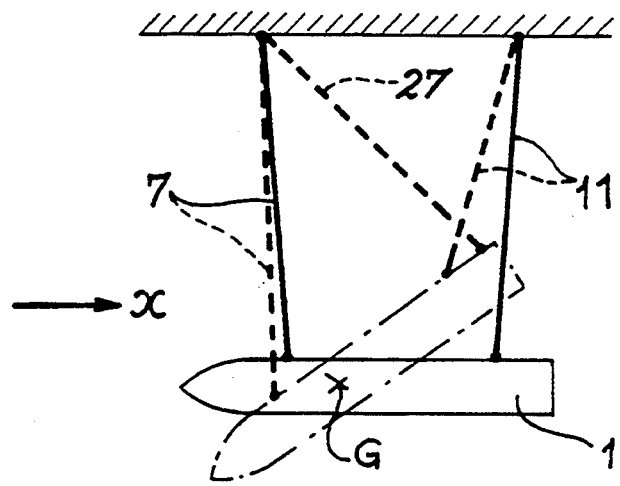
Figure 4:
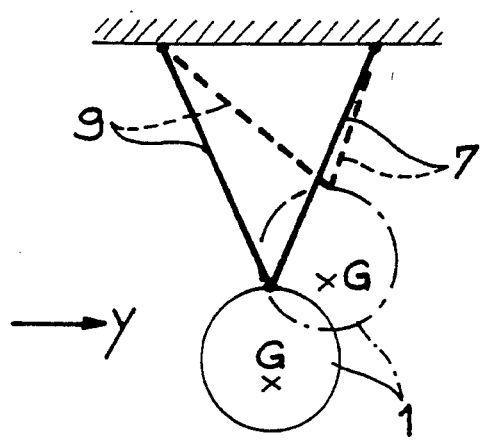

FIGS. 3 and 4 Diagrams illustrating the displacements of the object to be positioned.

Figure 5:
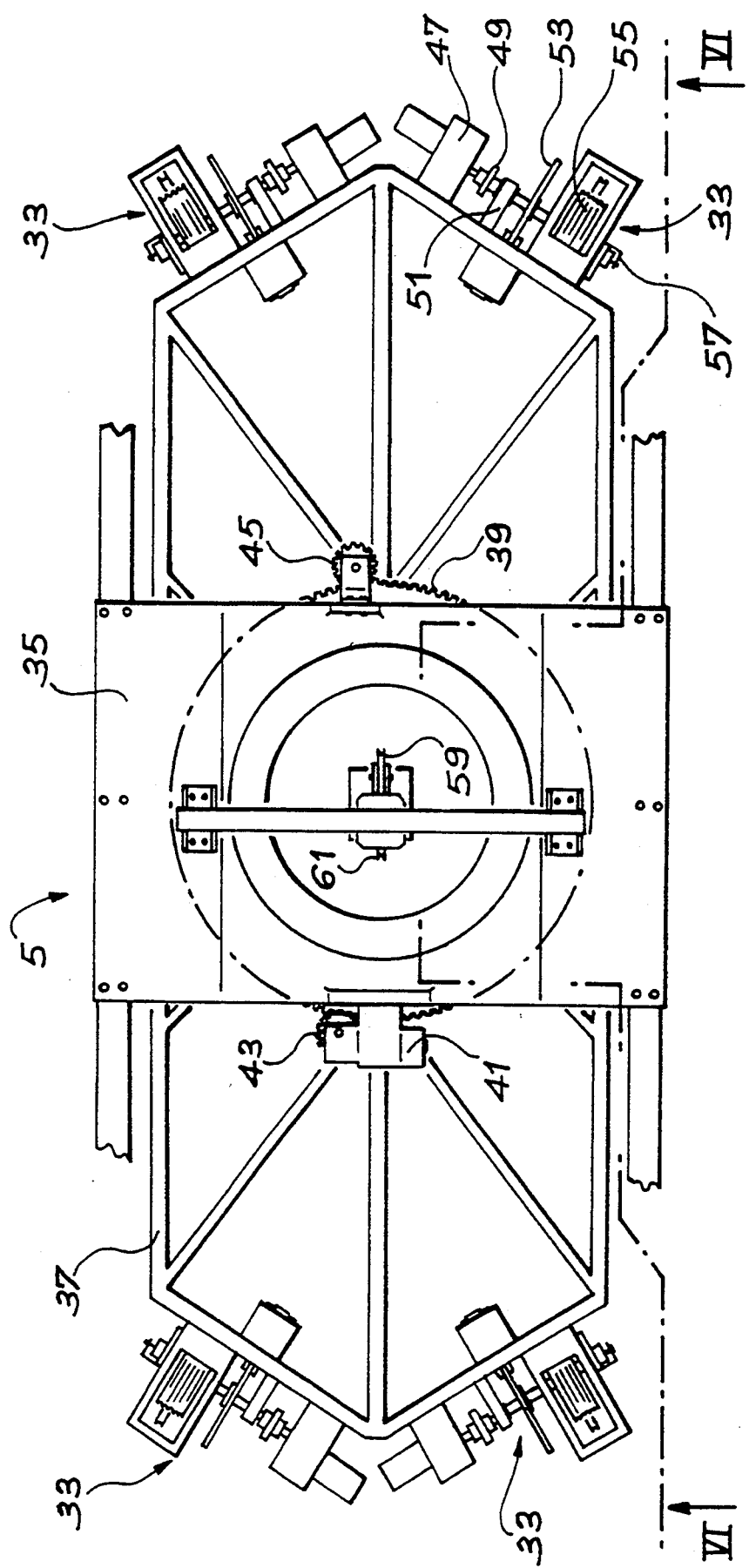

FIG. 5 A plan view of the positioning structure support according to the invention.

Figure 6:
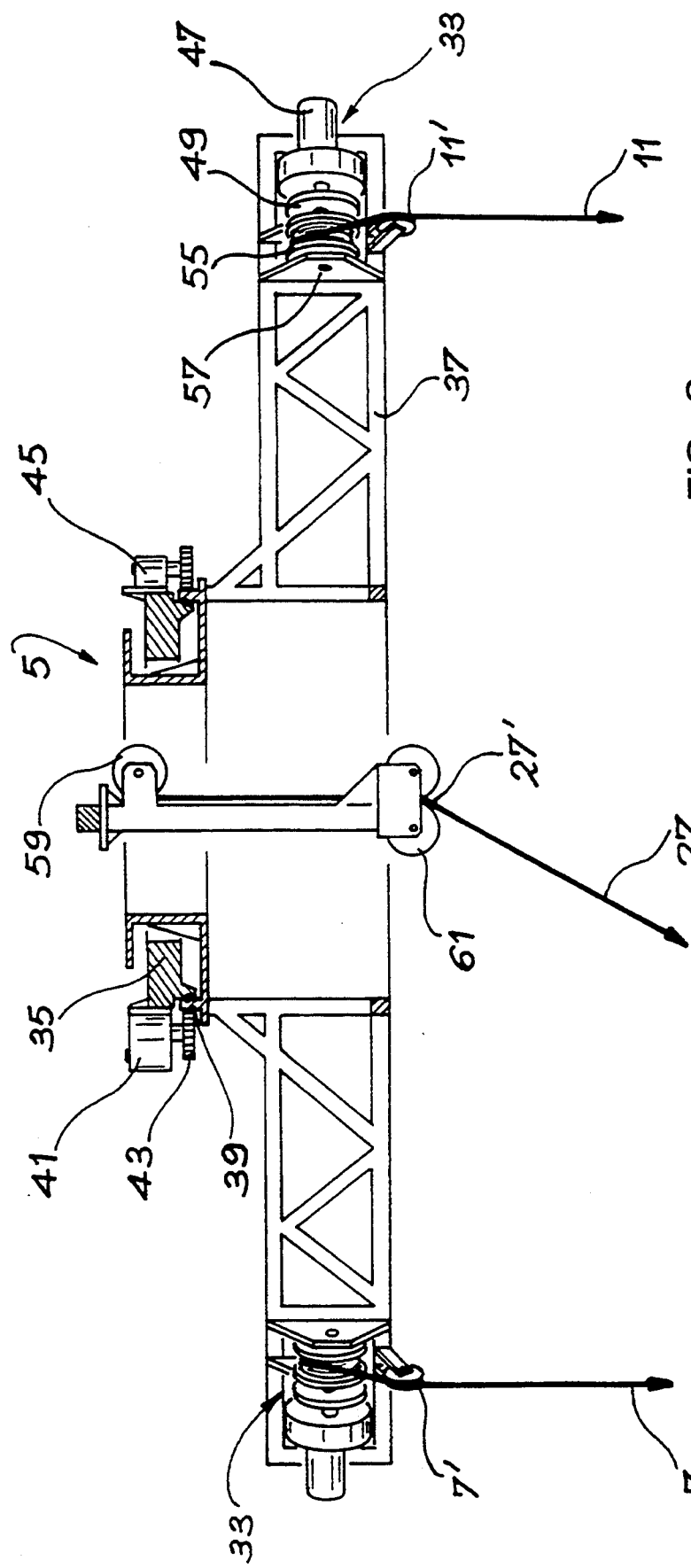

FIG. 6 A sectional view of the support along line VI—VI of FIG. 5.

FIG. 1 illustrates a structure for positioning an object 1, in this case represented by a missile, in a three-dimensional coordinate system 3. The system 3 is e.g. an anechoic or dead room, whose walls, floor and ceiling constitute the three dimensions of the coordinate system. The positioning structure according to the invention is more particularly applicable to said anechoic room, but it is obvious that the same structure could also be used in any other enclosure and for different purposes.

This positioning structure comprises a support 5 under which the object 1 is suspended by a first pair of slings 7, 9 and a second pair of slings 11, 13. As is e.g. illustrated in FIG. 1, the first pair of slings 7, 9 is fixed to the front part of the object by two fixing points 17, 19, whilst the second pair of slings 11, 13 is fixed to the rear part of the object by two other fixing points 21, 23 (cf. also FIG. 2). More generally, these two pairs of fixing points are respectively located on either side of the transverse vertical plane 25 passing through the centre of gravity G of the object. These two pairs of fixing points 17, 19 and 21, 23 are attachment points or hooks provided on the surface of the specimen missile 1. The centre of gravity G has been represented in arbitrary manner slightly displaced towards the front of the object 1. These four slings 7, 9, 11, 13 are fixed to the support 5 at four different suspension points 7', 9', 11', 13' respectively.

The object 1 is also fixed by at least one fifth sling 27 attached to the support 5 by a fifth suspension point 27' and fixed to the object 1 level with a fifth fixing point. This fifth fixing point is located either to the front or to the rear of the object 1 with respect to the transverse plane 25 and is designated either 29 or 30. It is also possible to have on the surface of the object 1 two hooks 29, 30 and choose to attach the fifth sling to one or other of these hooks at the time of the measurements. This point 29 or 30 is placed in the longitudinal vertical plane 31 including the centre of gravity G of the object 1. Moreover, the two pairs of fixing points 17, 19 and 21, 23 are also distributed over the longitudinal vertical plane 31.

Finally, this positioning structure comprises means for regulating the length of each of the slings, said regulating means being identical and designated in general terms 33 and will be described in greater detail hereinafter. They are fixed to the support 5.

The usefulness of the fifth sling will now be described in greater detail relative to FIGS. 2 to 4.

FIG. 2 is a diagram illustrating the suspension of the object 1 by means of 5 slings. The position of the fifth sling 27 and the orientation of the object in space have been chosen in an arbitrary manner. If the object 1 was only held by the four slings on hoisting from the ground to the position in space where it is wished to place it, it would perform an oscillating movement in the longitudinal direction, indicated by the arrow X. The oscillation in the longitudinal direction is not limited and the object can oscillate for a certain time before reassuming its equilibrium position. Therefore the fifth fixing sling 27 makes it possible to rapidly limit the oscillation in the longitudinal direction.

On carrying out the radar signature measurements, it is indispensable to perform these when the object 1 or missile has different incidences with respect to the ground. During displacements of the object 1, it is necessary for the centre of gravity G of the object not to be displaced with respect to the three-dimensional coordinate system for reasons of radar, illumination and homogeneity. The fifth sling 27 not only makes it possible to aid the positioning of the object 1, but also maintains or recentres its centre of gravity G. As a function of the desired incidence of the object, one of the fixing points 29 or 30 will be chosen and used.

FIG. 3 is a diagram illustrating the function of the fifth sling in the displacement of the centre of gravity G in the longitudinal direction (arrow x). On this diagram, only one sling of each pair is shown, e.g. the slings 7 and 11. The two slings of each pair are of the same length and are displaced symmetrically. The centre of gravity G is not equidistant of the fixing points 17, 21, but is slightly displaced towards the front of the object.

In the first position shown in continuous line form the object is horizontal. If it is wished to pivot it, so as to give it a positive incidence with respect to the ground, it will be necessary to shorten or lengthen the length of one of the pairs of slings. By means of dotted lines is shown an arbitrary position of the object 1, in which it is inclined relative to the horizontal, but its centre of gravity G has not moved. It is not possible to obtain this position with only four slings, because then the object 1 would not be in its position of equilibrium. The fifth sling 27 makes it possible to obtain this displacement of the object 1 without displacing the centre of gravity G.

As illustrated in FIG. 4, each pair of slings 7, 9 (or 11, 13) makes it possible to displace the centre of gravity G of the object 1 in a plane perpendicular to its longitudinal axis. This displacement of the centre of gravity G (passage from the continuous line position to the mixed line position) takes place by lengthening or shortening one of the slings of a pair and in this case by shortening the sling 7.

It is readily apparent that by combining the length changes of all the slings, it is possible to displace the centre of gravity G in the entire space or instead keep it stationary, despite the displacements of the object. It would also be possible to have more than five slings.

Advantageously and as illustrated in FIG. 2, the four suspension points 7', 9', 11' and 13' are located at four corners or angles of a right-angled parallelogram and preferably in the same plane. In general, for each pair of slings, the two suspension points of one pair 7', 9' or 11', 13' are positioned equidistantly of a horizontal line 34 from the longitudinal vertical plane 31 including the centre of gravity G of the object. Moreover, the fixed suspension point 27' is advantageously placed equidistant of the four other points and if possible in the same horizontal plane. However, this fifth suspension point 27' could also be vertically displaced.

Moreover, the support 5 supporting the ends of the fixing slings can turn in a horizontal plane about a vertical axis passing through the fifth suspension point 27'.

FIGS. 5 and 6 illustrate the support 5 and the means 33 for regulating the length of each sling. The support 5 comprises a fixed frame 35 attached to the ceiling of the anechoic room and a mobile frame-work 37, which has a spare ring 39. A motor 41 mounted on the fixed frame 35 rotates a rack wheel 43, which in turn drives the spur ring 39. This device makes it possible to rotate the framework 37 and regulating means 33 by 360° about the axis passing through the suspension point 27'. A coder 45 makes it possible to detect the rotation angle of the framework 37.

The five sling length regulating means 33 are identical, so that only that supporting the sling 11 will be described. This regulating means 33 successively comprises a motor 47, preferably a geared motor, a coupling 49, a bearing 51, a brake 53, a drum 55 on which is wound the sling 11 and a coder 57 making it possible to detect the number of revolutions performed by the drum 55. The precision of the drum rotation movement is less than 1 mm, so as to obtain a positioning of the object 1 in space below 1 mm, taking account of possible sling stretching.

The means 33 for regulating the length of the central sling 27 and differing from the four other springs in that they incorporate supplementary guide pulleys 61 in order to ensure that the sling 27 does not pass out of the guide pulley 59 in front of the drum 55, when the incidence of said sling varies.

Advantageously all the slings are made from polyamide threads, known under the trademark KEVLAR, metallic wires or any other material having the desired flexibility and strength properties. It is important that the slings have a high tensile strength. For illustration only, it is possible to use slings with a diameter of 6 mm for raising a load of 1 tonne. In addition, these slings must be sufficiently flexible to easily wind around the drums 55 of the regulating means 33.

According to the preferred embodiment of the invention illustrated in FIG. 1, the means 33 for regulating the length of each sling are connected to servocontrol means 63, which are themselves connected to at least two apparatuses 65 for measuring the position of the object 1 with respect to the three-dimensional coordinate system, only one connection being shown for reasons of simplification in the drawing. These measuring apparatuses 65 are generally theodolites arranged around the object 1 and making it possible to carry out measurements relative to two sighting marks provided for this purpose on the said object. Advantageously the servocontrol means 63 incorporate a computer 66 and a comparator 67. The computer 66 makes it possible for the technician to introduce data D relating to the spatial position of the object 1, said data being e.g. the inclination of the object 1 with respect to the ground and the different walls of the anechoic room and the position of the centre of gravity G of the object 1 with respect to the three-dimensional coordinate system formed by said room. The comparator 67 makes it possible to compare these predetermined measurement values with the values supplied by the theodolites 65. In more general terms, these servocontrol means 63 permit, as a function of the comparison carried out between these values, to act on the motor 47 of the length regulating means 33 relative to each sling, so as to wind up or unwind more or less thereof as a function of the desired object final position.

Having described preferred embodiments of the present invention, what is claimed is:

1. A structure for the positioning and stabilization of an object at a given point within a three-dimensional coordinate system, which structure comprises a support, two pairs of slings for suspending the object from said support, means for regulating the length of each sling, said two pairs of slings being respectively attached at four different suspension points of the support and at two pairs of fixing points provided on the surface of the object on each side of a transverse vertical plane passing through the center of gravity of the object, at least one fifth sling attached to the support at a fifth suspension point of the support different from the first four suspension points, extending downwardly and attached to the object at a fifth fixing point provided on the surface of the object and located in a longitudinal vertical plane including the center of gravity of the object to be positioned and on one or another side of the transverse vertical plane, the two pairs of fixing points also being located in the longitudinal vertical plane.

2. The structure according to claim 1, wherein the first four suspension points are located at the four angles of a right-angled parallelogram.

3. The structure according to claim 2, wherein the fifth suspension point is positioned equidistantly of the first four suspension points.

4. The structure according to claim 1, wherein the first four suspension points of the support are located in the same horizontal plane.

5. The structure according to claim 1, wherein the support is rotatable in a horizontal plane about a vertical axis passing through the fifth suspension point.

6. The structure according to claim 1, wherein the means for regulating the length of each sling comprises a drum about which is wound a corresponding sling and a geared motor for rotating the drum.

7. The structure according to claim 1, wherein all the slings are formed of polyamide threads or metal wires.

8. The structure according to claim 1 wherein the means for regulating the length of each sling and are connected to servocontrol means of apparatuses for measuring the position of the object relative to the three-dimensional coordinate system, said servocontrol means comprising a computer and for acting on the regulating means.

9. The structure according to claim 1, wherein the three-dimensional coordinate system comprises an anechoic room.

10. The structure according to claim 1, wherein the slings are formed of a flexible material.

* * * * *